US006380714B1

(12) United States Patent
Chou

(10) Patent No.: US 6,380,714 B1
(45) Date of Patent: Apr. 30, 2002

(54) CHARGER FOR WIRELESS PRODUCT

(75) Inventor: Chin-Wen Chou, Hsin-Tien (TW)

(73) Assignee: Shin Jiuh Corp., Taipei Hsien (JP)

( * ) Notice: Subject to any disclaimer, the term of this patent is extended or adjusted under 35 U.S.C. 154(b) by 0 days.

(21) Appl. No.: 09/813,128

(22) Filed: Mar. 21, 2001

(51) Int. Cl.⁷ .............................................. H01M 10/46
(52) U.S. Cl. ....................................................... 320/114
(58) Field of Search ................................. 320/103, 107, 320/110, 112, 113, 114, 115, 128, 137

(56) References Cited

U.S. PATENT DOCUMENTS 5,659,335 A  *  8/1997  Partridge, III
5,983,073 A  *  11/1999  Ditzik

* cited by examiner

Primary Examiner—Edward H. Tso
(74) Attorney, Agent, or Firm—Bacon & Thomas, PLLC

(57) ABSTRACT

A charger for a wireless product comprises a wireless product having a power unit for supplying power to the wireless product; a computer having standard connecting ports which are not connected to any means; a standard connecting wire having one end being connected to the power unit, and having another end being connected to the standard connecting port. The computer charges to the power unit through the standard connecting wire. Then the power unit supplies power to the wireless product. When the power source of the wireless product can not be used, the computer will supply power to the wireless product so that the wireless product will operate continuously.

7 Claims, 2 Drawing Sheets

CHARGER FOR WIRELESS PRODUCT

BACKGROUND OF THE INVENTION

The present invention relates to a charger for a wireless product, and especially to a charger which charges power to a wireless product or supply power to a wireless product in emergency.

Currently, a computer is operated through a keyboard or a mouse, and thus, the keyboards or mice are connected to the computer through a connecting wire. In use, the operating instruction of a keyboard or a mouse is transferred to a computer directly, and the power required by the keyboard or a mouse is directly supplied from the computer.

Nowadays, mobile phones or wireless products, such as wireless keyboards, wireless mice, etc. are used widely, however, in using these products can not use the power from the computer so that dry battery or charging batteries must be further added for supplying power required by the wireless products. Furthermore, the quality of these dry batteries or charging batteries will affect the convenience of the wireless products.

Since in general the dry batteries or charging batteries will age so that the outputs of the batteries are abnormal or no power is outputted. Therefore, some AC/DC converters or chargers are used to resolve these problem. However, these AC/DC converters or chargers are only used to some special joints or special input voltages of some wireless products. Furthermore, the volumes of these AC/DC converters or chargers are too large so that they can not be used to other applications.

SUMMARY OF THE INVENTION

Accordingly, the primary object of the present invention is to provide a charger for a wireless product, in which a standard connecting wire serves to connect a computer to a wireless product. Other than supplying power of power unit to the wireless product, in emergency, the power of computer can be used to charge the wireless product.

To achieve aforesaid object, the present invention provides a charger for a wireless product, a standard connecting wire has one end being connected to the power unit of the computer, and has another end being connected to the standard connecting port of the computer. The computer charges to the power unit through the standard connecting wire. Then the power unit supplies power to the wireless product. When the power source of the wireless product can not be used, the computer will supply power to the wireless product so that the wireless product will operate continuously.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
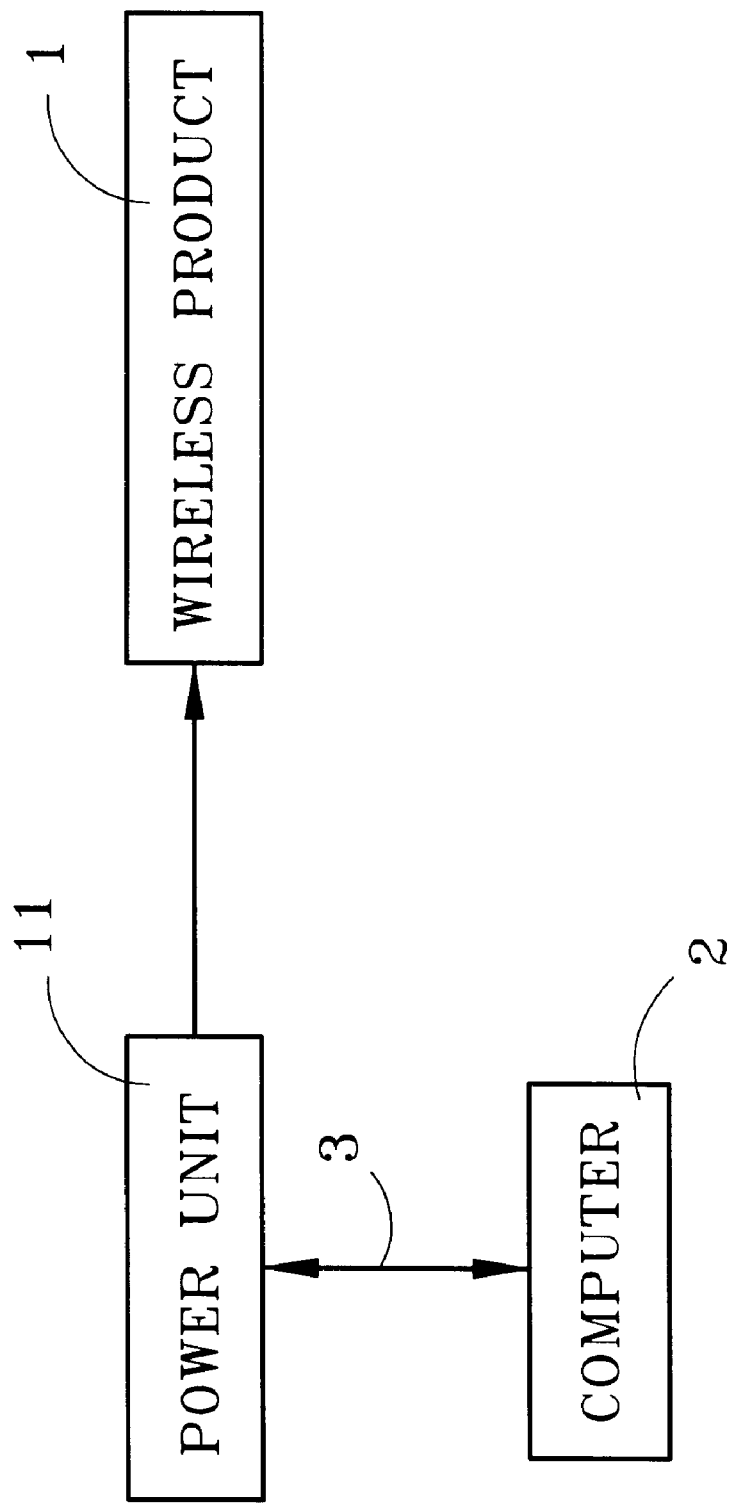
FIG. 1 is a schematic view of the first embodiment in the present invention.

With reference to FIG. 1, the schematic view of a first embodiment according to the present invention is illustrated. As shown in the figure, in the charger for a wireless product of the present invention, as a computer 2 is operated, a standard connecting wire 3 is used to connect the wireless product 1 to the computer 2. When the internal power of the wireless product 1 is exhausted, then power from the computer 2 will be supplied to the wireless product 1 through the standard connecting wire 3 so that the wireless product 1 will operate continuously.

The aforesaid wireless product 1 may be a commercial keyboard, a mouse, a palm top computer, a notebook computer, a keypad, etc. each of the wireless products has a power unit 11 for supplying power to operate the product. This power unit 11 is a storage element or a dry battery. As the power is used up, this storage element can recharge power, or a general dry battery can be directly used to supply power to the wireless product 1.

One end of the standard connecting wire 3 is connected to the aforesaid wireless product 1, while another end thereof is connected to a port of a personal computer PC, a notebook computer NB or IA, which is not connected to any means. This connecting port serves to provide power required by the wireless product 1.

When this standard connecting wire 3 is used to connect the wireless product 1 with the computer 2, the power from the computer 2 will charge the storage element. Then the power required as the wireless product 1 operates is supplied from the storage element so that the storage element is retained with a power source. If the operation time is too long so that the storage element is aged and then can not be used to charge or supply power, the computer 2 can directly supply power to the wireless product 1 so that the user may operate the computer 2 by the wireless product 1.

If the power in the wireless product 1 is supplied from a general dry battery, when the power of the battery exhausts, the computer 2 will supply power to the wireless product 1 immediately so as to avoid the wireless product 1 from tripping so that data can not be inputted or the computer 2 can not be operated.

Figure 2:
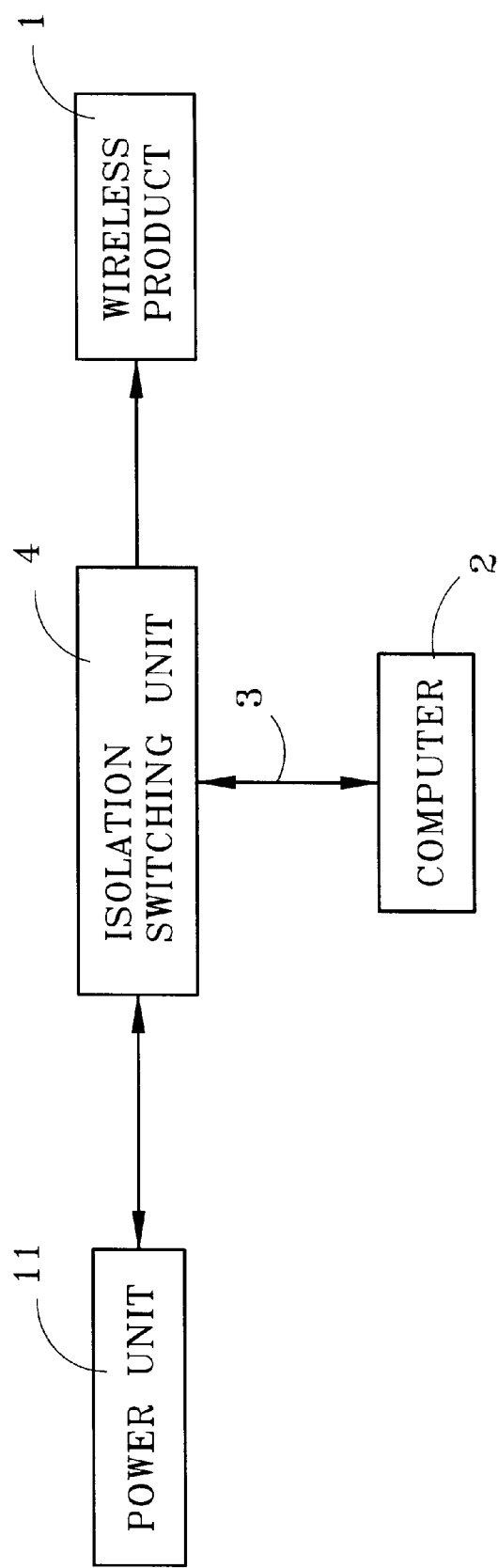
FIG. 2 is a schematic view of the second embodiment in the present invention.

Referring to FIG. 2, a schematic view of the second embodiment of the present invention is illustrated. As shown in the figure, in the present invention, an isolation switching unit 4 is added to the aforesaid power charger. This isolation switching unit 4 can be connected between the wireless product 1 and the power unit 11, while one end of the standard connecting wire 3 is connected to the isolation switching unit 4, and another end thereof is connected to the connecting port of the computer 2.

When being used, the power unit 11 serves to supply power to the wireless product 1, and meanwhile the power of the computer 2 will charge the power unit 11 through the standard connecting wire 3. When the power unit 11 ages and can supply power to the wireless product 1, the isolation switching unit 4 immediately switches the power source and then computer 2 supplies power to the wireless product 1 so that the user may use the wireless product 1 to operate the computer 2 continuously.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A charger for a wireless product comprising:
   a wireless product having a power unit for supplying power to the wireless product;
   a computer having standard connecting ports which are not connected to any means;
   a standard connecting wire having one end being connected to the power unit, and having another end being connected to the standard connecting port;
   wherein the computer charges to the power unit through the standard connecting wire; then the power unit supplies power to the wireless product; when the power source of the wireless product can not be used, the computer will supply power to the wireless product so that the wireless product will operate is continuously.

2. The charger for a wireless product as claimed in claim 1, wherein the wireless product is one selected from a group containing a keyboard, a mouse, a palm top computer, a notebook computer, a keypad.

3. The charger for a wireless product as claimed in claim 1, wherein the power unit is a storage element or a dry battery.

4. The charger for a wireless product as claimed in claim 1, wherein the storage element is a chargeable battery.

5. The charger for a wireless product as claimed in claim 1, wherein the computer is one selected from a group containing a personal computer, a notebook computer; an information applications.

6. The charger for a wireless product as claimed in claim 1, wherein the standard connecting port of the computer is selected from one of a group containing USB ports and IEEE1394 ports.

7. A charger for a wireless product comprising:
   a wireless product having a power unit for supplying power to the wireless product;
   an isolation switching unit connected between the power unit and the wireless product;
   a computer having standard connecting ports which are not connected to any means;
   a standard connecting wire having one end being connected to the isolation switching unit, and having another end being connected to the standard connecting port;
   wherein the power unit supplies power to the wireless product, and meanwhile computer charges to the power unit through the standard connecting wire; then the power unit supplies power to the wireless product; when the power source of the wireless product can not be used, by switching the isolation switching unit, the computer will supply power to the wireless product so that the wireless product will operate continuously.

* * * * *